United States Patent
Sicher et al.

[15] 3,667,373
[45] June 6, 1972

[54] AUTOMATIC MACHINE FOR VENDING FRIED FOODS

[72] Inventors: Frederic A. Sicher, Glen Ellyn; Joseph Gaysowski, Westchester, both of Ill.

[73] Assignee: said Sicher, by said Gaysowski

[22] Filed: June 8, 1970

[21] Appl. No.: 44,232

[52] U.S. Cl. ............................................................. 99/407
[51] Int. Cl. ....................................................... A47j 37/12
[58] Field of Search................... 99/407, 409, 330, 336, 319, 99/408, 410, 411, 403; 141/271, 270, 272, 273, 297, 82, 98, 105, 106, 104, 107, 100, 101, 270, 284, 250

[56] References Cited

UNITED STATES PATENTS

| | | | |
|---|---|---|---|
| 3,274,920 | 9/1966 | Benson | 99/407 X |
| 3,398,672 | 8/1968 | Hoeberigs | 99/407 |
| 3,068,912 | 12/1962 | Shaw | 99/407 X |

Primary Examiner—Leon G. Machlin
Attorney—Greist, Lockwood, Greenwalt and Dewey

[57] ABSTRACT

A fried potato vending machine characterized by an upright cabinet having mounted therein a support for a removable multiple bin supply tray adapted to have each bin filled with a predetermined quantity of raw or partially cooked potatoes and a mechanism for feeding the batches of potatoes from successive bins to a hopper which empties into a cooking bowl pivotally mounted above a storage vessel in which a supply of cooking oil is maintained at predetermined temperature by an immersion heater and means for transferring a quantity of the hot cooking oil to the cooking bowl in which successive batches of potatoes are cooked and when cooking is completed, the cooked potatoes are dumped into a serving tray fed from a supply stack, the cooking bowl being pivoted, when cooking of each batch is completed, to dump the oil through a removable and replaceable filter member into the storage vessel. Electrical operating and control circuitry, which is actuated by deposit of a coin, includes drive motors and timed switches for operating the feeding and handling mechanisms and provides for heating the oil, the electrical requirements being such that the machine can be operated when supplied with current from a conventional 110–115 Volt current supply line.

19 Claims, 12 Drawing Figures

AUTOMATIC MACHINE FOR VENDING FRIED FOODS

This invention relates to vending machines for marketing food products and is more particularly concerned with improvements in machines for processing and delivering small batches of french fried potatoes or a similar product.

Various machines have been proposed heretofore for processing and delivering small batches or individual servings of a food product, such as fried potatoes. While a few of these machines have achieved some degree of commercial acceptance, others have not been successful for various reasons, such as, failure to provide proper sanitation in the handling of the product or proper protection of the product against contamination, failure to produce a product having uniform quality or a satisfactory degree of processing, and unacceptable servicing requirements. Other devices have proven too expensive in operation or too high in initial cost. Another factor which has hindered the acceptance of these machines has been the relatively high wattage current supply generally required for maintaining the cooking oil at the temperature required for successful operation. This has meant that most of these machines cannot be operated by current from existing lighting supply circuits but require a higher voltage supply line which many prospective users have found objectionable from a cost standpoint.

It is a general object of the present invention to provide a vending machine for processing and vending foods, such as, french fried potatoes, which meets relatively strict sanitation requirements, which will operate efficiently with a minimum of attention, which is readily supplied with a food product in a manner which greatly reduces the risk of spoilage and contamination, and which does not have a high voltage current requirement so that it may be operated when supplied with current from a conventional 110–115 Volt current line.

A more specific object of the invention is to provide in a food vending machine an arrangement for supplying separate batches or quantities of the food product for processing and vending which enables the individual batches of the product to be assembled on a tray at a point remote from the vending area with the tray or trays being constructed so that they may be transported to and inserted in the machine while adequately protected against contamination, thereby permitting replacement of the supply at intervals which will insure the vending of a clean and fresh product.

Another object of the invention is to provide in a vending machine for french fried potatoes, or the like, a container of sufficient size to hold a substantial supply of cooking oil with an immersion heater for maintaining the oil at the required temperature and with a supplemental container to which a small supply of the cooking oil may be transferred for the cooking of a batch of the product and which is operated to dump the oil therein, after each batch is cooked, back into the larger supply container through a filter so as to maintain a clean supply of the cooking oil at the required cooking temperature without requiring the use of a high voltage current supply.

A further object of the invention is to provide a food processing and vending machine in which the food storage and processing apparatus is confined to a small area and sealed against escape of cooking odors, without the necessity for elaborate venting or exhausting equipment, and with minimum access to the food areas so that the latter may be maintained free of vermin and the like.

These and other objects and advantages of the invention will be apparent from a consideration of the food vending machine which is shown by way of illustration in the accompanying drawings wherein.

Figure 1:
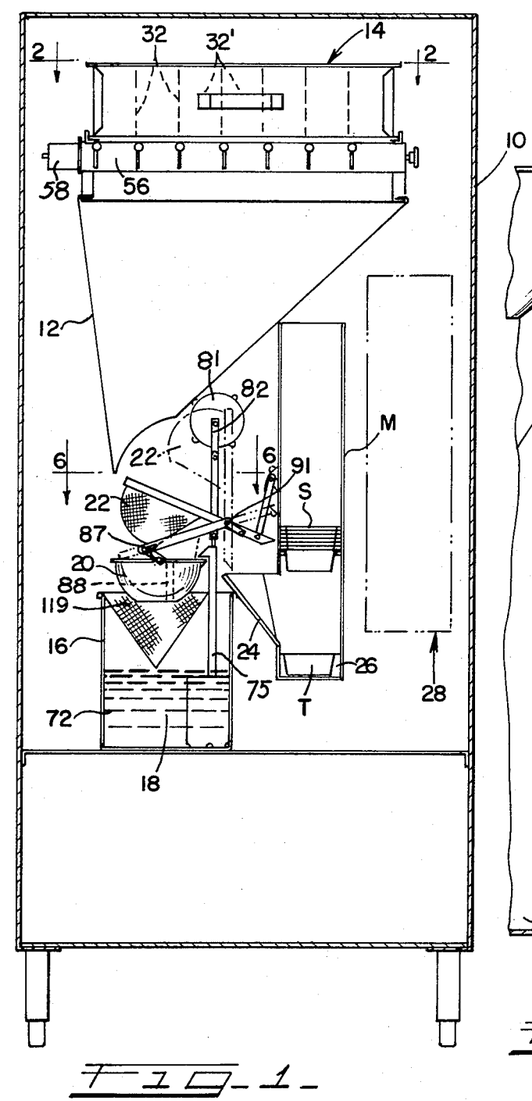
FIG. 1 is an elevational view of an apparatus for processing and vending a food product, such as, french fried potatoes, the apparatus being enclosed in a vertically disposed cabinet and one wall of the cabinet being removed to expose the apparatus to view.

Referring first to FIG. 1 of the drawings, there is illustrated a machine for processing and vending french fried potatoes which incorporates therein the principal features of the invention. The apparatus is enclosed or confined in an upright cabinet structure 10 which is of generally rectangular configuration and which is constructed so that it is normally sealed against access from the exterior except for a coin slot and an opening into a tray accommodating recess enabling the finished product to be taken out of the machine, the product, in the machine illustrated, being a tray of french fried potatoes generally of a size intended for a single serving. The cabinet 10 may have hinged doors or removable panels permitting it to be opened for servicing the apparatus. Otherwise, the cabinet 10 is designed to provide a substantially sealed chamber in which the apparatus is confined so that vermin or the like have no access to food areas and there is adequate protection against contamination of the food by entrance of dirt or other substances.

A funnel-like hopper 12 is mounted in upright fixed position in the cabinet 10 with a relatively wide open top adapted to receive thereon a removable and replaceable bin forming tray 14 by means of which a plurality of individual batches of the potatoes, prepared for frying, are supplied to the machine. An open top container or receptacle 16 of substantial capacity is disposed below the bottom or discharge end of the hopper 12 for containing a substantial supply of cooking oil 18. A smaller container 20 of bowl-like form is pivotally mounted between the top of the oil supply or storage container 16 and the bottom of the hopper 12 and also a wire basket 22 is mounted on a pivot for swinging into and out of the cooking bowl 20, with an intermediate position in which the basket 22 will receive a batch of potatoes from the discharge end of the hopper 12 and a final position in which the fried potatoes are discharged into a chute 24 leading to a compartment 26 into which a small serving tray T may be fed from a stack S in a magazine M mounted above the chute 24, the lower discharge end of which extends into the top of the chute 24. A coin operated control box, indicated at 28, is mounted within the housing 10 with a coin receiving slot (not shown) accessible at the front of the machine for the deposit of a coin to operate the processing and vending apparatus.

Figure 2:
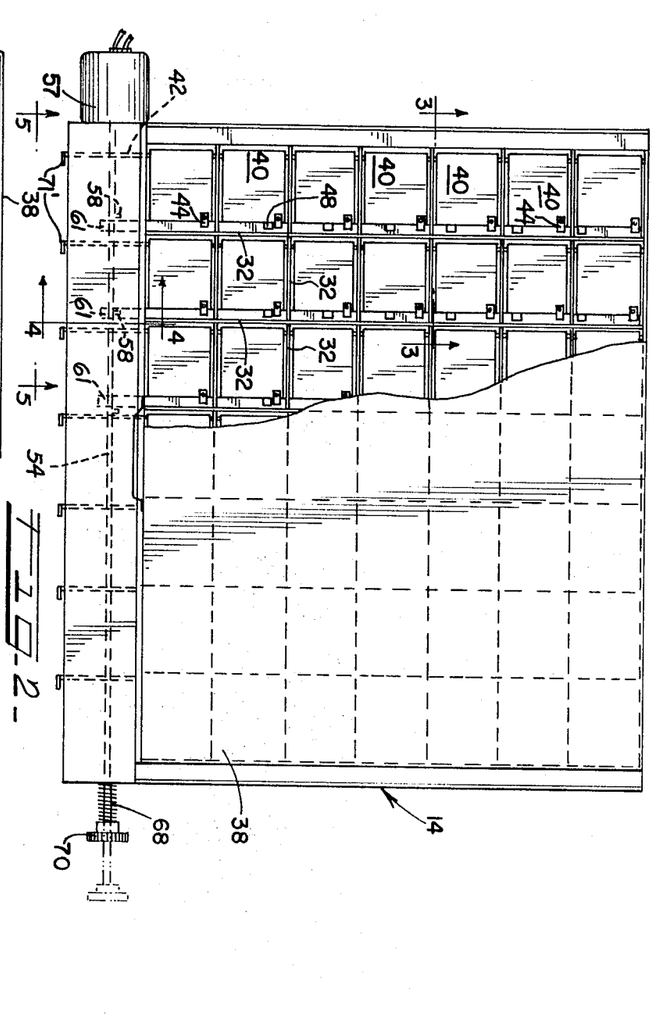
FIG. 2 is a view taken on the line 2—2 of FIG. 1, to an enlarged scale and with portions broken away.
Figure 3:
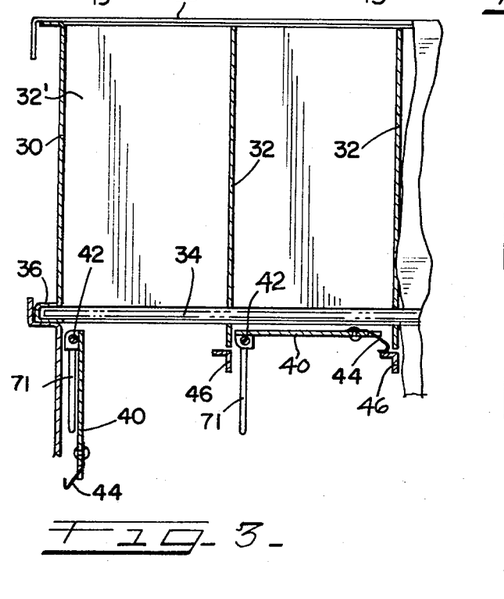
FIG. 3 is a fragmentary cross section taken on the line 3—3 of FIG. 2, to an enlarged scale.

The bin forming supply tray 14, in the form shown, comprises an outer frame 30 (FIGS. 2 and 3) with a series of partitions 32 forming generally rectangular bins or compartments 32' which, in the form shown, are 49 in number, so as to provide for that number of batches of potatoes, with the bins 32' being arranged in seven rows of seven bins each. The potatoes are initially prepared in the proper size for french frying, and, preferably, are partially processed so as to reduce the tendency to discolor and also to shorten the time required for complete processing. The removable and replaceable supply tray 14 has a bottom plate 34 which is slidably mounted in guideways 36 formed at the bottom of the tray and a cover member 38 adapted to be placed on the top of the tray. The hopper 12 is provided with a peripheral flange 39 on which the tray 14 is adapted to rest. The tray 14 may be loaded in an area remote from the machine into which it is to be placed so that any number of machines may be supplied from a common supply area and the potatoes need not be exposed while they are transported to and placed in the vending machine.

Figure 4:
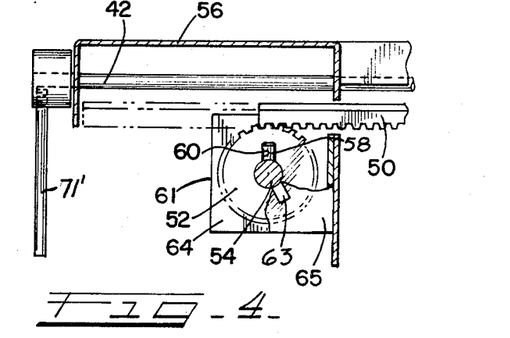
FIG. 4 is a fragmentary cross section taken on the line 4—4 of FIG. 2, to an enlarged scale.
Figures 5, 6:
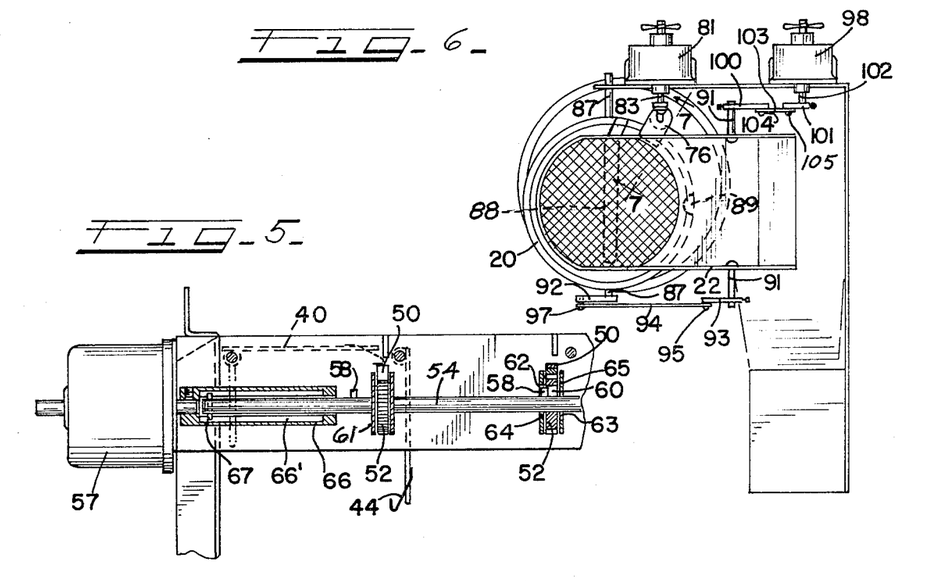
FIG. 5 is a view taken on the line 5—5 of FIG. 2, to a larger scale.
FIG. 6 is a view taken on the line 6—6 of FIG 1, to an enlarged scale.

Mechanism is provided for feeding the batches of potatoes from the bottom of the tray 14 which comprises a series of swingably mounted bottom release doors 40. Each door 40 is swingably mounted on a pivot shaft 42, there being a shaft 42 for the doors in each row of bins from front to back as viewed in FIG. 1. Each door 40 has a small spring clip member 44 which extends from the edge opposite the pivot 42 and in the closed position is adapted to rest on a slidably mounted angle bar 46. The angle bar 46 has a series of notches 48 which are spaced the proper distance along the length of the bar 40 so that they may be aligned with the spring clips 44 on the successive release doors 40, thereby allowing the later to swing to open position in succession, that is, one by one, from the front to the back of the tray, as viewed in FIG. 2. There is a support bar 46 provided for each of the seven lines of bins and the bars 46 are operated in succession from left to right so as to release the successive doors in order. The bars 46 in the successive rows release the doors 40 in order by axial shifting of the same predetermined distances. Each of the release bars 46 has a toothed end section 50 (FIG. 4) which is adapted to engage with a gear 52 mounted on a shaft 54 journaled in a housing 56 at the forward end of the tray 14. The shaft 54 is mounted for rotation by a stepping motor 57 and is also movable in the direction of its axis so as to engage a radial finger 58 thereon in a slot 60 provided in the gear 52. Each gear 52 is retained in a housing 61 (FIGS. 4 and 5) which has slots 62 and 63 in opposite walls 64 and 65 which are spaced circumferentially of the associated gear 52 so that the finger 58 may pass through the slot 62 in the left wall and engage in the slot 60 in the fear 52 and after the gear 52 has been rotated to release all the doors 40 through shifting of the release bar 46 the finger 58 will disengage the gear 52 and pass through the slot 63 in the opposite wall 65 in the gear housing 61 so as to discontinue rotation of that gear. The gears 52 and gear housings 61 are slotted and arranged so that successive gears 52 are operated as the shaft 54 is moved predetermined distances along its axis. The shaft 54 is connected to the stepping motor 57 by a sleeve-type coupling 66 (FIG. 5) having aligned, axially extending slots 66' accommodating a radial pin 67 in the shaft 54 and a spring 68 is provided for constantly urging the shaft in an axial direction, to the right in FIG. 5, until all the gears 52 have been rotated to release all the doors 40. The shaft 54 has a reset handle or knob 70 which is adapted to be rotated and the shaft returned to its initial or starting position against the force of the spring 68 with the release bars 46 each being retracted to original position. The door carrying shafts 42 have a reset lever 71 for each of the doors 40 and each shaft 42 is adapted to be rotated manually, by means of a handle lever 71' (FIG. 2) at the forward end, to reposition the release doors 40 and close the bin bottoms preparatory to replacement of an emptied supply tray 14 with a new supply tray 14. The housing 56 is open at the front and bottom as shown in FIG. 4 to provide access to the door release mechanism.

Figure 7:
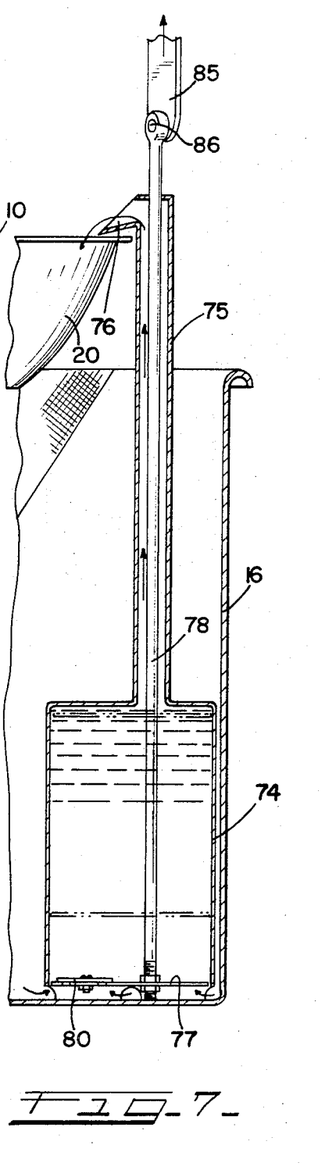
FIG. 7 is a fragmentary cross section taken on the line 7—7 of FIG. 6.

The oil supply container 16 is of sufficient size to receive a substantial quantity of the oil 18 and an immersion heater element 72 may be provided for maintaining the oil 18 at the desired temperature. The oil supply receptacle 16 is provided with an oil lift assembly which is shown in FIG. 7. It comprises a tubular member 74 which is adapted to accommodate a predetermined quantity of the oil 18 and having an upstanding tubular member 75 of smaller diameter which terminates in a laterally extending spout 76 disposed to empty into the cooking bowl 20 when the latter is in the normal non-tilted position as shown in FIG. 1. The oil is lifted through the tube 75 by a piston forming plate 77 on the lower end of a piston-like rod 78 which extends up through the tube or conduit 75. The piston 77 has a check valve 80 permitting the refilling of the tubular base portion 74 upon return of the piston 77 to the bottom of tube 74. The piston forming rod 78 is raised and lowered by an operating motor 81 (FIGS. 6 and 8) having an arm 82 on its output shaft 83 which is pivoted at 84 to the upper end of a link member 85 which is in turn pivotally connected at its lower end at 86 to the top end of the lift rod or piston member 78.

Figures 8, 9:
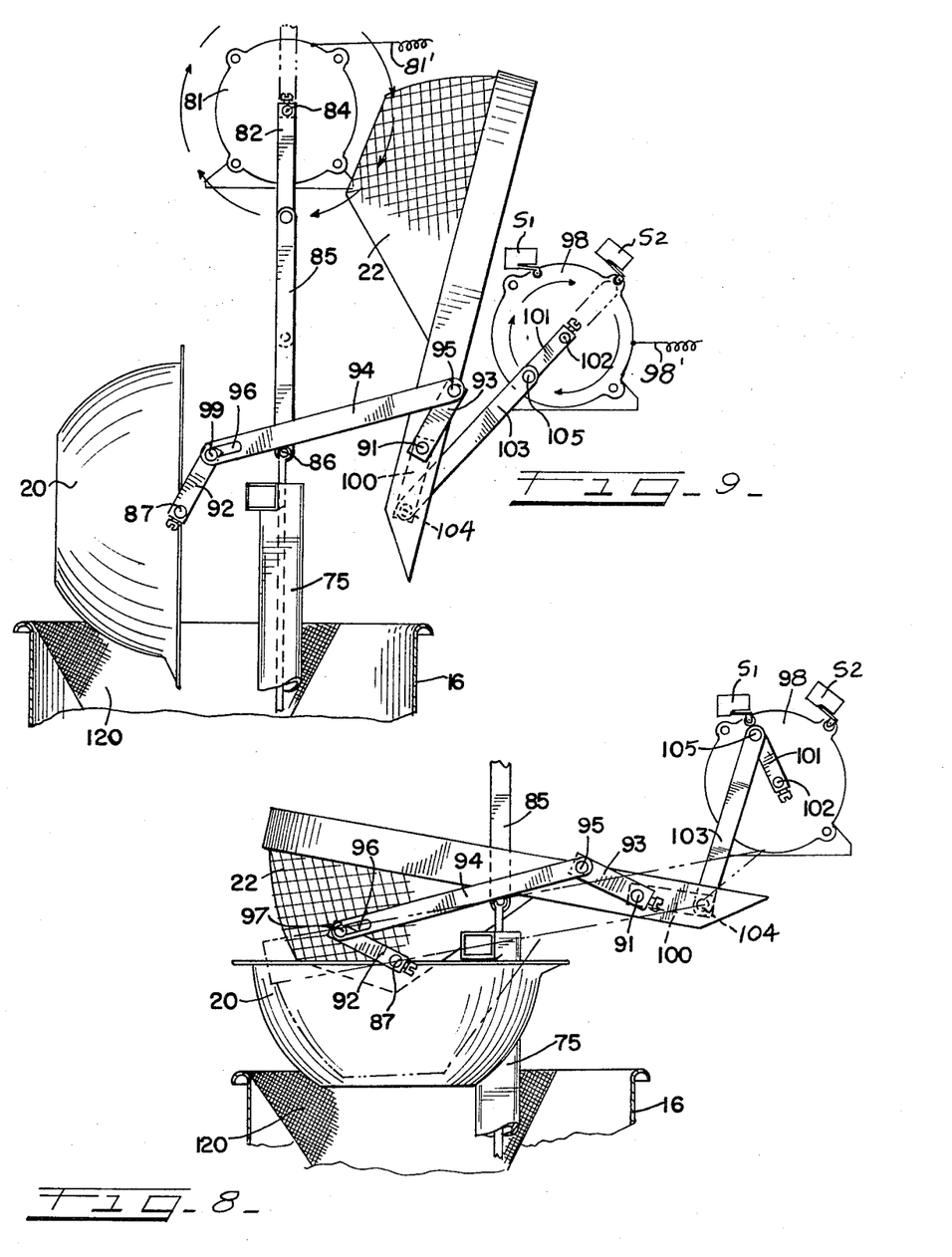
FIG. 8 is a view taken on the line 8—8 of FIG. 6.
FIG. 9 is a view similar to the view in FIG. 8 with the cooking basket and bowl in dumping position.

The cooking bowl 20 is mounted on a pivot shaft formed by pins 87 having the fixed pivot axis extending transversely of the top of the oil supply receptacle 16 and is tiltable about the same in a clockwise direction as shown in FIG. 1 The bowl 20 has a thermostatically controlled heating element 88 which is operated to maintain the cooking oil constantly at the temperature required for proper cooking prior to and during the cooking process. The heating unit can be mounted to tilt with the bowl or remain in a fixed position without interferring with the tilting of the bowl 20 or the movement of the basket 22. The bowl 20 has a spout 89 and is adapted to be tilted by motor 90 which also tilts the wire basket 22 into which the potatoes are delivered and retained during the cooking. The basket 22 is mounted to pivot on the shaft formed by pivot pins 91 having a pivot axis extending transversely of oil receptacle 16 and is swung to the different positions indicated in FIG. 1. The pivot shaft 87 for cooking bowl 20 has an arm 92 secured thereon which is connected to a like arm 93 secured on the shaft 91 for the basket 22 by a link bar member 94. The link bar 94 is pivoted at 95 to the end of arm 93 and has a slot 96 at the opposite end receiving a pivot 97 on the end of arm 92 so as to provide a lost motion connection which enables the basket 22 to be lowered into the bowl 20 for the cooking operation at the end of the movement of the basket 22. The basket 22 and bowl 20 are connected to the motor 90 for operation. An arm 100 is secured on the pivot shaft 91 and connected to a like arm 101 secured on the motor output shaft 102 by a link 103, which is pivoted at 104 and 105 to the ends of the arms 100 and 101. The several positions of the basket 22 are illustrated in FIGS. 1, 8 and 9. The position shown in solid line in FIG. 8 is the position in which potatoes are received from the hopper 12 while the frying position, where the basket is in the bowl 20, is shown in phantom line in the same view and the dumping position is shown in FIG. 9. Switches S1 and S2 are operated by the end of arm 101 and form part of the control circuit for motor 98 which is connected by lead indicated at 98' to a timer operated movement control switch. The oil pump motor 81 is also connected electrically by a lead indicated at 81' to a timer control switch in the electrical control circuit.

The trays T which are stored in the magazine M are dispensed from the stack S by conventional denesting and stack feeding mechanism which may take any well known form. Various forms of stack feeders which are designed to be electrically controlled for timed deposit of a tray are available commercially and may be used. Also, coin actuated control apparatus 28 for this type of operation is readily available commercially in various forms and the details of this and the tray feeding apparatus form no part of the present invention and are not further described.

Figure 10:
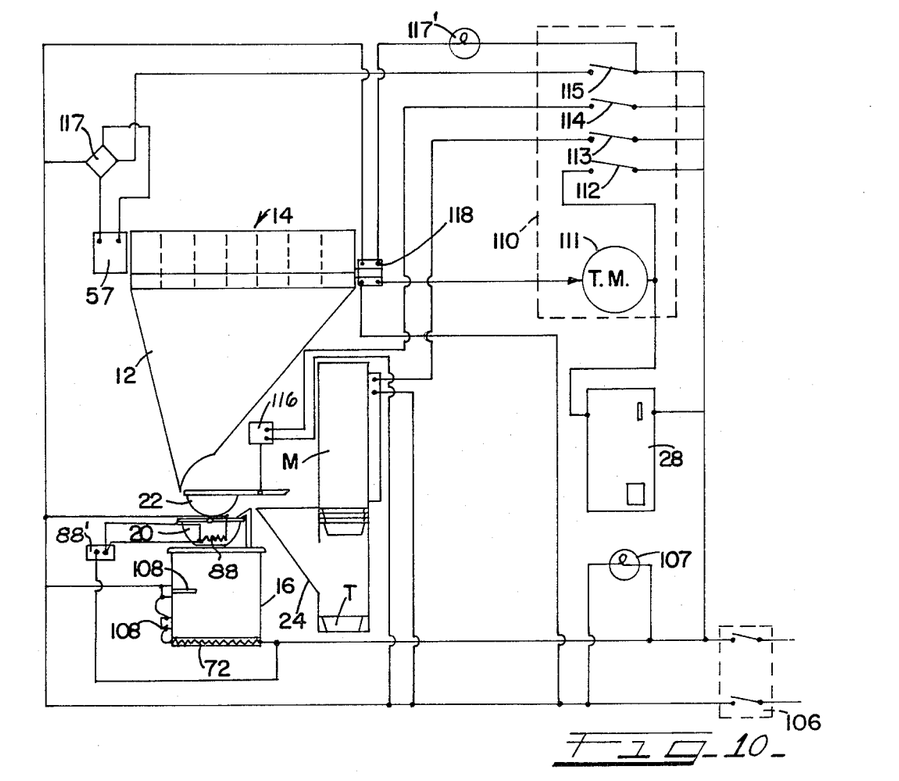
FIG. 10 is a schematic view illustrating the operating circuitry for the machine.

A circuit for controlling the operation of the various mechanisms in proper timed relation is shown in FIG. 10. An ordinary 110–115 Volt line supplies current through an on-off control switch 106, with pilot light 107, to the heating unit or element 72 in the oil supply container 16, the temperature of the oil being controlled by suitable thermostats 108. The temperature of the oil will generally be maintained at approximately 400° F. and one of the current control thermostats 108 will be set to serve as a safety cut-off to prevent overheating of the oil and also to activate the heating element 72 when the temperature falls below the desired 400° F. The heating unit 88 in the bowl 20 and controlling thermostat 88' are also part of this circuit and the two heating units 72 and 88 enable the oil to be maintained at the desired temperature in both the supply container 16 and in the cooking bowl 20 without requiring high wattage electrical input, that is, without requiring a wattage input higher than generally provided by an ordinary 110–115 Volt supply line. The control circuit includes a multi-circuit cam timer apparatus 110 which includes a timer motor 111 and cam operated switches 112, 113, 114 and 115 which control the operation of the motors 57, 81, 98 and a tray release device for the magazine M. The pump timer and frying basket and bowl movement control is indicated at 116. The circuit for operating the bins in the feed tray 14 includes rectifier 117, an "empty" light 117′, and switch 118 which cuts out the timer motor 111 and turns on the light 117′ when the last bin release door 40 is operated so that a coin will not start an operating cycle. The cycle of operation is normally started, when there are potatoes in one or more of the bins 32′, by deposit of the required coin in the coin slot. This activates the timer motor 111 and cycles the cam operated switches 112, 113, 114 and 115. The switch 112 is closed to keep the timer motor 111 operating. Switch 115 releases the potatoes in one of the bins 32′ into the hopper 12 and switch 114 actuates the motor 98 to tilt the basket 22 in proper timed sequence. The basket 22 and bowl 20 are connected for simultaneous operations by the linkage 92, 93 and 94 so that the oil used in cooking each batch of potatoes is dumped back into the supply container or reservoir 16. A filter cone 119 of suitable material is removably supported in the top of the container 16 beneath the cooking bowl 20 which may be replaced at intervals so as to maintain a clean supply of oil 18. The lift for the oil is operated by the motor 81 which is timed to fill the bowl 20 with the required amount of oil as soon as the bowl returns to normal cooking position after dumping the oil from the previous cooking.

The arrangement for supply of potatoes may be modified to increase the supply available without reloading the machine. Additional space may be provided at the top of the cabinet and provision made for more than one bin or supply tray 14. Additional trays may be accommodated by providing guides for receiving the same in vertically aligned relation and associated motor operated mechanism for operating release doors for the bins. The lowermost tray would, of course, be emptied first and with the release doors for the bins in that tray remaining in open position. The release doors for the bins in a tray above the same could then be operated to dump potatoes through the open bins in the bottom tray. Thus a number of supply trays in stacked or superimposed relation could be provided which would be operated successively to dump the potatoes down through the empty and open bottom bins in the trays below. Also, dual stacks of supply trays in side-by-side or upwardly diverging relation could be provided and operated to dump into a common chute leading to the cooking tray or bowl.

Figure 11:
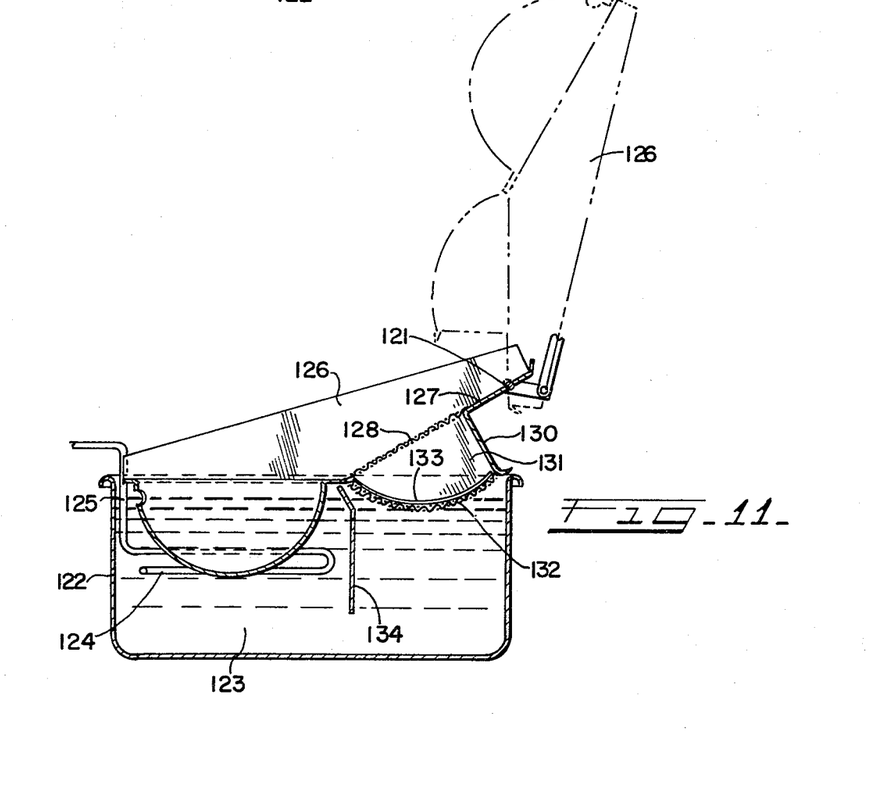
FIG 11 is a vertical sectional view illustrating a modified form of cooking bowl and supply container for the cooking oil.
Figure 12:
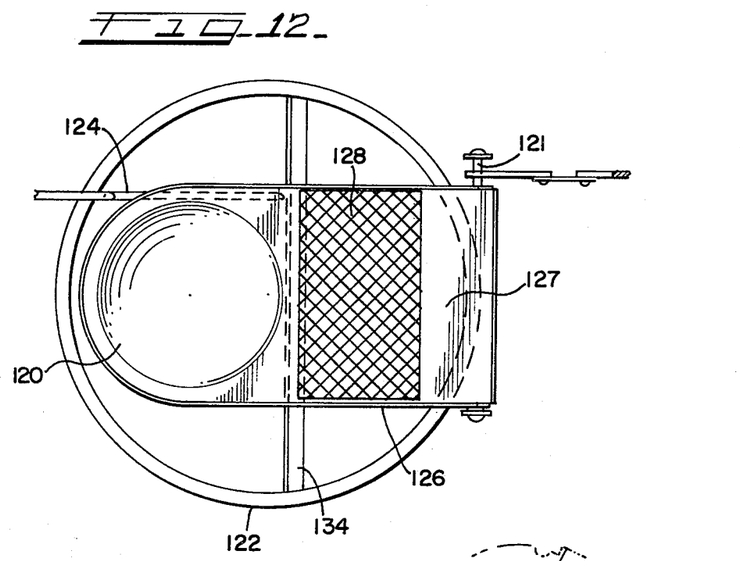
FIG. 12 is a plan view of the apparatus illustrated in FIG. 11.

A modified cooking bowl and oil supply arrangement for the machine is illustrated in FIGS. 11 and 12. In this arrangement the frying basket, the oil lift pump and one of the heating elements, which are employed in the apparatus of FIGS. 1 to 10, are eliminated. This simplifies the apparatus and eliminates a number of moving parts. The frying bowl 120 is mounted to swing on an axis 121 extending transversely above the open top of a receptacle or container 122 in which cooking oil 123 is maintained at proper temperature for cooking the potatoes or other product by heating coils 124. The bowl 120 has a filling hole 125 in the side wall near the top at a point opposite the supporting pivot or hinge 121 so that upon lowering the bowl into the oil supply 123 the bowl will fill with the oil to the level in the container 122 for cooking the potatoes which have been fed into the bowl prior to complete lowering of the same. The bowl 120 is carried at the free end of a tray-like arm 126 which is pivoted on the axis 121, the latter being located above the level of the bowl 120 when the latter is in the cooking position, with the floor 127 of the arm or tray member 126 inclined downwardly in the direction of the bowl. A wire screen 128 constitutes the portion of the floor 127 which is immediately adjacent the rim of the bowl 120, the mesh thereof being sufficiently small to prevent the passage of the potatoes but allowing the oil from the bowl 120 to pass through when the tray 126 is swung upwardly in a clockwise direction as viewed in FIG. 11. The side walls of the tray 126 are extended beneath the screen area 128 and cooperate with the cross wall 130 to form a compartment 131, the bottom of which is the form of a screen 132 with provision for supporting thereon a removable and replaceable filter sheet 133 for filtering the oil used in each cooking operation. The screen 128 may be hingedly mounted so that there is access to the compartment 131 for replacement of the oil filter sheet 133. The tray 126 is open at the hinged end so as to dump the fried potatoes in a discharge chute, such as chute 24 in FIG. 1, when the tray is swung to the dumping position shown in phantom line in FIG. 12. The oil receptacle 122 is partitioned in part by a baffle 134. The tray 126 may be swung to the different positions for cooking and dumping by motor operated mechanism of the same character as shown in FIGS. 8 and 9.

We claim:

1. A processing and vending machine for fried potatoes or similar food products, comprising a container for a supply of cooking oil, means for maintaining the temperature of the cooking oil sufficiently high for cooking successive batches of the potatoes, a cooking bowl mounted on a fixed pivot axis at the top of said oil supply container so that the cooking bowl may be swung between a generally horizontal frying position above the cooking oil in the container and a generally vertical position for dumping the contents into said container, means for transferring to the cooking bowl from the supply of oil a sufficient quantity of the oil for cooking a batch of the potatoes, means mounted above the cooking bowl for supplying successive batches of the potatoes and for placing each successive batch of potatoes in the cooking bowl for cooking, means for removing the cooked potatoes from the bowl at the end of a predetermined cooking period, means for swinging the cooking bowl to said dumping position after the cooking operation and thereby returning the cooking oil to the oil supply container, and a replaceable element for filtering the cooking oil disposed in the top of the oil supply container so that oil dumped from the bowl passes through the same and is returned to said supply container.

2. A processing and vending machine as set forth in claim 1 and said means for transferring cooking oil to the cooking bowl comprising a pump for lifting a predetermined quantity of the oil from the supply container to the cooking bowl.

3. A processing and vending machine a set forth in claim 1 and said means for placing each successive batch of potatoes in the cooking bowl comprising a basket for receiving a batch of the potatoes which basket is mounted for movement between a position where it is disposed in the cooking bowl for the cooking operation and a position where it is free of the cooking bowl so that the cooking bowl may be swung to said contents dumping position.

4. A processing and vending machine for fried potatoes or similar food products, comprising a container for a supply of cooking oil, means for maintaining the temperature of the cooking oil sufficiently high for cooking successive batches of the potatoes, a cooking bowl mounted on a pivot axis so that the cooking bowl may be swung between a generally horizontal frying position and a generally vertical position for dumping the contents, means for transferring to the cooking bowl from the supply of oil a sufficient quantity of the oil for cooking a batch of the potatoes, means for supplying successive batches of the potatoes, basket means for receiving a batch of the potatoes and for placing each successive batch of potatoes in the cooking bowl for cooking, which basket is mounted for movement between a position where it is disposed in the cooking bowl for the cooking operation and a position where it is free of the cooking bowl so that the cooking bowl may be swung to said contents dumping position, means for removing the cooked potatoes from the bowl at the end of a predetermined cooking period, means for swinging the cooking bowl to said dumping position after the cooking operation and returning the cooking oil to the oil supply container including a replaceable element for filtering the cooking oil, and said cooking bowl and basket having a connecting linkage so that upon movement of the basket to a position where it is free of the cooking bowl the cooking bowl will be swung by the connecting linkage to said contents dumping position.

5. A processing and vending machine as set forth in claim 4 and said connecting linkage including a lost motion connection enabling the cooking bowl to be swung to cooking position after which the basket will be swung into the cooking bowl for the cooking operation.

6. A processing and vending machine as set forth in claim 1 and said means for placing each successive batch of potatoes in said cooking bowl comprising a perforated basket mounted on an arm which is pivotally mounted so as to enable said basket to be swung to a position for receiving a batch of potatoes and thereafter to a position within said cooking bowl for the cooking operation.

7. A processing and vending machine as set forth in claim 1, and said means for supplying successive batches of the potatoes including a removable and replaceable tray-like container for a plurality of batches of the potatoes.

8. A processing and vending machine as set forth in claim 1 and said means for supplying successive batches of the potatoes including a removable and replaceable container having a plurality of compartments each adapted to receive a batch of the potatoes.

9. A processing and vending machine for fried potatoes or similar food products, comprising a container for a supply of the cooking oil, means for maintaining the temperature of the cooking oil sufficiently high for cooking successive batches of the potatoes, a cooking bowl mounted on a pivot axis so that the cooking bowl may be swung between a generally horizontal frying position and a generally vertical position for dumping the contents, means for transferring to the cooking bowl from the supply of oil a sufficient quantity of the oil for cooking a batch of the potatoes, means for supplying successive batches of the potatoes including a supply container, partitions dividing said container into a plurality of bins each of which is adapted to contain a batch of the potatoes for cooking, means for placing each successive batch of potatoes in the cooking bowl for cooking, means for removing the cooked potatoes from the bowl at the end of a predetermined cooking period, means for swinging the cooking bowl to said dumping position after the cooking operation and returning the cooking oil to the oil supply container including a replaceable element for filtering the cooking oil.

10. A processing and vending machine for fried potatoes or similar products, said machine comprising a funnel-like hopper open at the top and bottom, a cooking oil supply container positioned below the bottom of the hopper, means for maintaining a supply of cooking oil in said container at a cooking temperature, a cooking container mounted between the bottom of said hopper and said cooking oil supply container which is of a size to hold a quantity of cooking oil for cooking a relatively small batch of potatoes, means for transferring a predetermined quantity of cooking oil from the supply container to said cooking container and returning the same to said supply container when a batch of potatoes has been cooked in said cooking container, a means at the top of said hopper for supporting a removable multi-batch potato supply container and associated means for feeding batches of the potatoes in predetermined succession from said potato supply container to said hopper for delivery to said cooking container, and said potato supply container comprising a tray-like member having partitions therein dividing said member into a plurality of bins for receiving separate batches of the potatoes.

11. A processing and vending machine as set forth in claim 10 wherein a guide means is provided at the top of said hopper for supporting in sliding relation therein said potato supply container.

12. A processing and vending machine as set forth in claim 10 and said means for feeding said batches of potatoes comprising gate forming means for each of the bins and a coin actuated means for operating said gate forming means in predetermined sequence.

13. A processing and vending machine as set forth in claim 10, wherein said potato supply container has open bottom bins for receiving batches of the potatoes and said means for feeding batches of said potatoes comprises gate means in the form of pivotally mounted, bottom closing plate members, means to normally hold said plate members in bin closing position and means to release each of said plate members for swinging movement to an open position so as to drop the batch of potatoes in the associated bin into said hopper.

14. A processing and vending machine as set forth in claim 13, and said means to release said plate members being operable in predetermined sequence so as to release the batches of potatoes in predetermined order.

15. A processing machine for fried potatoes or similar food products, comprising a container for a supply of cooking oil, means for maintaining the temperature of cooking oil in the container sufficiently high for cooking successive batches of the potatoes, a cooking bowl, an arm member on which the cooking bowl is carried, said arm member being mounted on a pivot axis so that the cooking bowl may be swung between a generally horizontal frying position at the top of the cooking oil supply container and a generally vertical position for dumping the contents, means for filling the cooking bowl with oil from the supply in sufficient quantity for cooking a batch of the potatoes, means for supplying successive batches of the potatoes to the cooking bowl, means for swinging the arm member carrying said cooking bowl to a dumping position after the cooking operation so as to return the cooking oil to the oil supply container, and the arm member on which said cooking bowl is carried being in the form of an open ended tray mounted on a pivot axis at one end of the tray, said cooking bowl being disposed at the end of the tray opposite said pivot axis and said pivot axis being located above the normal level of oil in said oil supply container, said tray being movable about said pivot axis to a position where it is inclined downwardly in the direction of the cooking bowl, and said means for swinging said arm member being operative to swing the arm into said inclined position where the cooking bowl is disposed in the cooking oil to permit the bowl to receive oil for a cooking operation.

16. A processing machine for fried potatoes or similar products as set forth in claim 15 and a screen covered opening in the floor of the tray between the bowl and the pivot axis permitting oil from the cooking bowl to pass through the screen for return to the oil supply container when the tray is swung to a generally vertical position.

17. A processing and vending machine for fried potatoes or similar products, said machine comprising a funnel-like hopper open at the top and bottom, a cooking oil supply container positioned below the bottom of the hopper, means for maintaining a supply of cooking oil in said container at a cooking temperature, a cooking container mounted between the bottom of said hopper and said cooking oil supply container which is of a size to hold a quantity of cooking oil for cooking a relatively small batch of potatoes, means for transferring a predetermined quantity of cooking oil from the supply container to said cooking container and returning the same to said supply container when a batch of potatoes has been cooked in said cooking container, a means at the top of said hopper for supporting a removable multi-batch potato supply container and associated means for feeding batches of the potatoes in predetermined succession from said potato supply container to said hopper for delivery to said cooking container, and said means for maintaining the supply of cooking oil in said oil supply container comprising a thermostatically controlled electrical heating element, said cooking container having a thermostatically controlled electrical heating element therein which is operative to maintain the relatively small quantity of oil in said cooking container at cooking temperature prior to and during cooking whereby the cooking oil in both the oil supply container and the cooking container may be maintained at cooking temperature with a current input of minimum wattage.

18. A processing and vending machine for fried potatoes or similar products, said machine comprising a funnel-like hopper open at the top and bottom, a cooking oil supply container positioned below the bottom of the hopper, means for maintaining a supply of cooking oil in said container at a cooking temperature, a cooking container mounted in a fixed position between the bottom of said hopper and said cooking oil supply container which is of a size to hold a quantity of cooking oil for cooking a relatively small batch of potatoes, means for transferring a predetermined quantity of cooking oil from the supply container to said cooking container, said cooking container being tiltably mounted for returning the cooking oil therein to said supply container when a batch of potatoes has been cooked in said cooking container, a means at the top of said hopper for supporting a removable multi-batch potato supply container and associated means for feeding batches of the potatoes in predetermined succession from said potato supply container to said hopper for delivery to said cooking container.

19. A processing machine for fried potatoes or similar food products, comprising a container for a supply of cooking oil, means for maintaining the temperature of cooking oil in the container sufficiently high for cooking successive batches of the potatoes, a cooking bowl mounted at the top of said container, an arm member on which the cooking bowl is carried, said arm member being mounted on a pivot axis so that the cooking bowl may be swung between a generally horizontal frying position above the cooking oil in the supply container and a generally vertical position for dumping the contents, means for filling the cooking bowl with oil from the supply in sufficient quantity for cooking a batch of the potatoes, basket means movably mounted adjacent the cooking bowl for carrying successive batches of the potatoes into and out of the cooking bowl, mean for operating said basket means so as to hold each batch of potatoes in the bowl for a predetermined period sufficient to cook the potatoes, means for swinging the arm member carrying said cooking bowl to a dumping position after the cooking operation thereby to return the cooking oil to the oil supply container.

* * * * *